(12) United States Patent
Stallone et al.

(10) Patent No.: US 6,836,052 B2
(45) Date of Patent: Dec. 28, 2004

(54) DEVICE FOR TENSIONING A STATOR WINDING

(75) Inventors: Francesco Stallone, Locarno (CH); Angelo Guarneri, Birr (CH)

(73) Assignee: ALSTOM Technology LTD, Baden (CH)

(*) Notice: Subject to any disclaimer, the term of this patent is extended or adjusted under 35 U.S.C. 154(b) by 0 days.

(21) Appl. No.: 10/385,517

(22) Filed: Mar. 12, 2003

(65) Prior Publication Data

US 2004/0007937 A1 Jan. 15, 2004

(30) Foreign Application Priority Data

Mar. 12, 2002 (CH) .............................. 0427/02

(51) Int. Cl.[7] .............................................. H02K 3/46
(52) U.S. Cl. .................................... 310/260; 310/270
(58) Field of Search ................................ 310/260, 270, 310/271, 194, 269

(56) References Cited

U.S. PATENT DOCUMENTS

| | | | | |
|---|---|---|---|---|
| 3,975,655 A | | 8/1976 | Beermann et al. .......... | 310/260 |
| 4,252,642 A | * | 2/1981 | Mohri ........................ | 209/452 |
| 4,488,079 A | | 12/1984 | Dailey et al. ................ | 310/260 |
| 5,355,046 A | * | 10/1994 | Weigelt ........................ | 310/260 |
| 5,436,520 A | * | 7/1995 | Huber ........................... | 310/260 |
| 5,734,220 A | * | 3/1998 | Rowe et al. ................ | 310/260 |
| 5,798,595 A | | 8/1998 | Nilsson et al. .............. | 310/260 |

FOREIGN PATENT DOCUMENTS

GB 1127916 9/1968 ............ H02K/3/50

OTHER PUBLICATIONS

Search Report prepared by the European Patent Office, issued Jul. 11, 2002, for Swiss Appl. No. CH4272002.
German Search Report Mar. 12, 2002 Germany.

* cited by examiner

*Primary Examiner*—Dang Le
*Assistant Examiner*—Nguyen Hanh
(74) *Attorney, Agent, or Firm*—Cermak & Kenealy; Adam J. Cermak

(57) ABSTRACT

The invention relates to a device (12) for tensioning a winding (9) of a stator (1), in particular a generator stator (1) of a power plant. The winding (9) includes a winding head (10). Several winding supports (13) are arranged at the front side (4) of the core (2). Each winding support (13) abuts against the front side (4) of the core (2) and via a pressure spring element (19) against the funnel-shaped outer side (14) of the winding head (10). The winding supports (13) are fixed at the winding head (10) in the circumferential direction and in the surface line direction of the winding head (10). The winding supports (13) are movable perpendicularly with respect to the outer side (14).

12 Claims, 1 Drawing Sheet

DEVICE FOR TENSIONING A STATOR WINDING

This application claims priority under 35 U.S.C. § 119 to Swiss application number 2002 0427/02, filed Mar. 12, 2002, the entirety of which is incorporated by reference herein.

FIELD OF INVENTION

The present invention relates to the tensioning of a winding of a stator, in particular a generator stator of a power plant.

PRIOR ART

A conventional stator, in particular a generator stator of a power plant, consists of a core and a winding comprised of multiple winding bars. Such winding bars are designed with the ends thereof extending out from the stator core on at least one axial front side of the latter, and are flexed and joined together to form a winding head at the front side of the core, which head extends in a funnel or cone shaped manner with increasing distance from the core. To operate the stator, the winding head must be braced, that is axially post-tensioned, at the core in the axial direction of the stator. Further, it is necessary to bias the winding head radially inwardly. Such tensioning of the winding head is necessary in order to allow for the absorption of electrodynamic forces that occur during operation. Conventionally, the desired tensioning of the winding or winding head is effected at the time of manufacture of the stator. However, during operation of the stator settling and other similar phenomena may occur which can adversely affect the tension applied to the winding or winding head.

BRIEF DESCRIPTION OF THE INVENTION

The present invention provides a remedy for this. The invention, as set forth in the claims, points to a solution for the problem of tensioning a stator winding or a winding head, which is better able to ensure that a desired, in particular, lasting tension is maintained.

The present invention is based on the general concept of bracing the winding head against winding supports using pressure spring elements, the winding supports being uniformly distributed about the circumference of and axially supported on the front side of the core. With the aid of the pressure spring elements it is possible to achieve the desired radial, inwardly directed tensioning of the winding head. Such uniform arch tension results advantageously in a permanent form closure between the winding head and the support means. The winding supports are arranged on the winding head so as to be able to move perpendicularly relative to the outer side of the winding head. Thus, the device according to the present invention is able to transfer the desired tension force from the winding supports to the winding head, even when the winding head contracts or expands in a radial direction due to settling, thermal expansion or the like. The shape of the winding head changes essentially perpendicularly to the outer side thereof and thus in the direction of force applied by the pressure spring elements, such that the latter are able to compensate for the relative movement between winding head and winding supports. Using pressure spring elements in the process that have a relatively flat spring characteristic can ensure that a change in length of the spring causes only a minimal change in tension force, that is, the pressure force of the pressure spring elements is virtually unaffected by a change in the relative position of the winding supports and winding head.

With the arrangement of the support means on the winding head in accordance with the present invention, that is, the placement of three components by means of pressure spring elements, it is possible to inhibit relative movement of the support means and the winding head under all operating conditions.

In one advantageous embodiment at least one of the pressure spring elements can have a first guide element with a central sleeve, a second guide element with a central, axially adjustable bolt within the sleeve, and a spring assembly comprised of multiple disk- or plate-shaped springs and arranged axially between the guide elements and concentrically to the sleeve. A pressure spring element of this kind is especially compact in design and enables the transfer or introduction of particularly strong pressure forces.

In a further modification, the pressure spring element may also include at least one spacer element arranged axially between the spring assembly and one of the guide elements and concentrically to the sleeve. With the aid of such a spacer element it is possible when installing the pressure spring element to vary the bias that the pressure spring element, when installed, transfers between the winding supports and the winding head. Moreover, with the aid of spacer elements of this type, it is possible, e.g. during inspections or maintenance work, to reset the bias of the pressure spring elements, in which the spacer element mounted in each is replaced with another spacing element of a different plate thickness.

It is expedient to affix each of several or all winding supports to the front side of the core by means of at least one axially tensioned plate spring, wherein all of the winding supports are arranged on the front side of the core in such a way that they are movable in a direction axial to the front side of the core. This design ensures that during axial expansion of the winding bars, the winding supports are able to yield to the concomitant axial shift of the winding head with no negative effect to the radial tension applied to the latter.

Additional substantive features and advantages of the present invention are set forth in the drawings and figure descriptions with reference to the drawings.

BRIEF DESCRIPTION OF THE DRAWINGS

A preferred embodiment of the present invention is shown in the drawings and is described in greater detail below, in which the same reference numerals make reference to identical, similar or functionally similar components. Shown schematically are, FIG. 1 a simplified axial cross-section of a stator in the region of a device according to the present invention, FIG. 2 a plan view corresponding to arrow II in FIG. 1, FIG. 3 a cross-section along the lines III in FIG. 1, and FIG. 4 an expanded view in longitudinal cross-section of a pressure spring element of the device of FIG. 1.

WAYS OF IMPLEMENTING THE INVENTION

Figure 1:
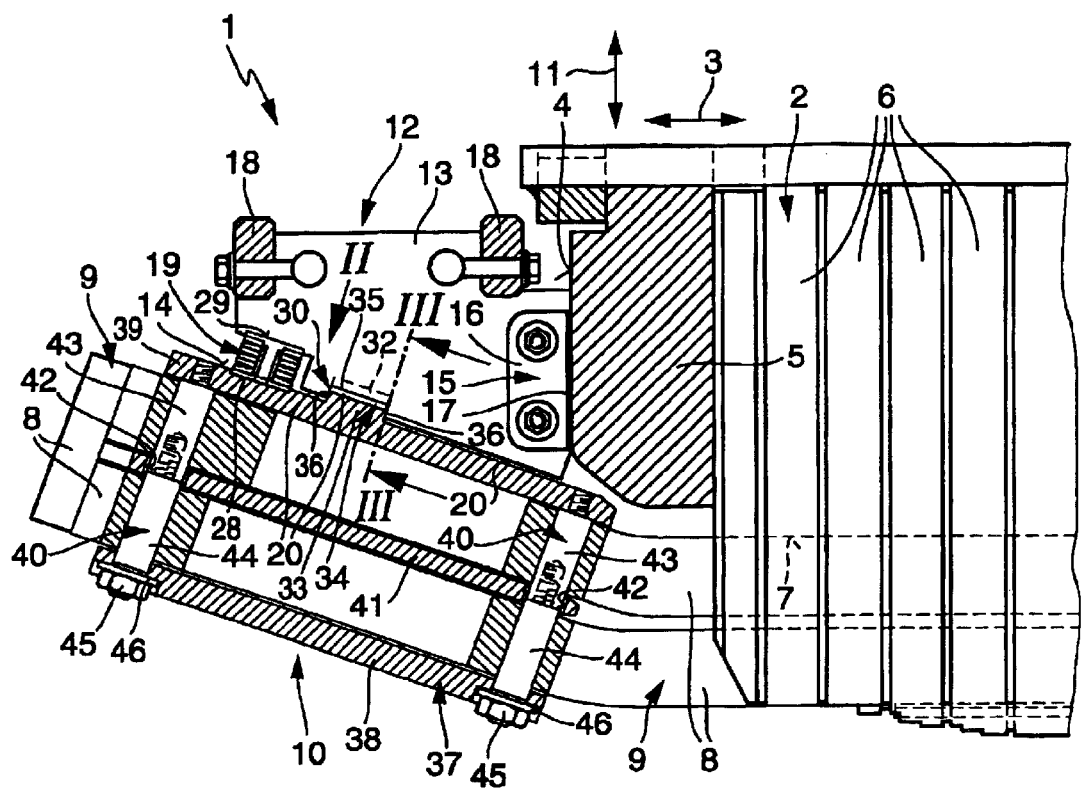

FIG. 1 includes a stator 1, only portions of which are shown, in particular a generator stator of a generator otherwise not shown, which is used in a power plant for purposes of generating electrical energy, a core 2 also represented only in part, and which is depicted in FIG. 1 such that its median longitudinal axis is aligned horizontally. The median longitudinal axis of core 2 is located outside the drawing area of FIG. 1. However, for illustrative purposes a double arrow is shown, running parallel to the median longitudinal axis of core 2 and thus representing axial direction 3.

Core 2 has an axially facing front side 4 defined herein by a pressure plate 5 of core 2. With the aid of two such pressure plates 5 arranged at both axial ends of core 2, it is possible to tension to one another in axial direction plate segments 6 which are arranged between said plates 5 and which form core 2. The inner circumference of core 2 is provided with multiple longitudinal grooves 7, in which the winding bars 8 of a winding 9 are housed. These winding bars 8 extend outwardly in axial direction 3 from the core 2 on the front side 4 of said core 2, and are flexed radially outwardly and in the circumferential direction of stator 1 (involutes). Winding bars 8 are flexed and so joined together as to form a winding head 10, said head extending in a funnel or cone shaped manner with increasing distance from the core.

In order to tension winding head 10 in radial direction 11 symbolized by a double arrow, or winding 9 or the winding bars 8 thereof in axial direction 3, a support means 12 according to the present invention is used. Said support means 12 comprises multiple winding supports 13 arranged on the front side 4 of core 2 and are distributed circumferentially and in particular, uniformly relative to winding head 10. Support means 12 abuts against core 2 axially by means of plate springs 15 and radially against winding head 10 by means of pressure spring elements 19. Only one of the winding supports 13 is shown in cross-section in FIG. 1.

With the aid of the wedge-or triangular shaped winding supports 13, forces with both axial and radial components are conducted into winding head 10. The funnel shape of winding head 10 causes the radial forces to be deflected in the form of an arch in the circumferential direction of winding head 10, resulting first in the stabilization of the shape of winding head 10 and secondly in a leveling of forces conducted via winding supports 13 in quasi-punctiform or quasi-linear form, such that winding 9 is acted upon substantially uniformly by the axial tensile forces.

Winding supports 13 are fixed or arranged in the present embodiment on the front side 4 of the core in such a way that they are movable in axial direction 3 relative to front side 4. The support means 12 shown in the present example is affixed on front side 4 of the core with the aid of plate springs 15 as to be movable in axial direction 3 of front side 4 counter to the pressure forces of plate spring 15. This is realized for example, by attaching a first segment 16 of plate spring 15 to winding support 13 and, at a distance therefrom, attaching a second segment 17 of said plate, optionally by way of a spacer element, to pressure plate 5. Said second segment 17 defines a plate or leg spring and is e.g. suitably arched between the points of attachment to ensure the desired amount of resiliency in axial direction 3.

Means 12 also includes two support rings 18, one of which is connected at the ends of winding supports 13 facing core 2, and the other of which is connected at the ends of winding supports 13 facing away from core 2. Via these common support rings 18, all the winding supports 13 are supported in radial direction 11 and are joined permanently together to support means 12.

According to the present invention each winding support 13 abuts via pressure spring element 19 the funnel-shaped outer side 14 of winding head 10. It is understood that two or more pressure spring elements 19 may be employed. With the aid of this type of pressure spring element 19 it is possible when assembling the winding head 10 or support means 12 to transfer a preset bias to winding head 10, which is radial or perpendicular to the outer surface 14 of the winding head. For this purpose winding supports 13 are arranged for adjustable movement relative to outer side 14 in the direction of the force transfer of spring elements 19, that is, perpendicular to the outer side 14 of winding head 10. In this way each winding support 13 is able to move perpendicular to outer side 14. Accordingly, FIG. 1 depicts an initial state, in which a gap 20 is formed outside of pressure spring element 19 between winding support 13 and outer side 14 of winding head 10. Such an initial state is present, for example, during normal operation or when a generator fitted with stator 1 is shut down; or such an initial state is also desired for assembling support means 12.

As previously described herein, winding head 10 is movable relative to winding supports 13 in a direction perpendicular to the outer side 14. In order to restrict the amount of movement between winding head 10 and winding supports 13 to the stated degree, further precautions described in detail below are taken, which act to fix each of the winding supports 13 both in the circumferential direction and in the surface line direction of winding head 10.

Figure 4:
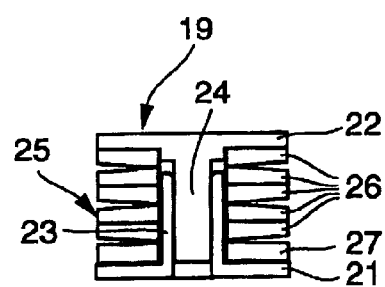

A preferred embodiment of pressure spring element 19 is described in greater detail with reference to FIG. 4. The pressure sprang element 19 depicted includes two guide elements 21 and 22. Said fist guide element 21 has a central sleeve 23 into which a cylindrical bolt 24 is coaxially inserted. Bolt 24 is formed centrally at the second guide element 22 and is arranged for axial movement within sleeve 23. Pressure spring 19 also includes a spring assembly 25 consisting of multiple disk- or plate-shaped springs 26 and which is arranged axially between both guide elements 21 and 22, and concentrically to sleeve 23. Finally, a spacer element 27 is provided which is arranged axially between spring assembly 25 and first guide clement 21, and concentrically to sleeve 23. The thickness of the spacer element 27 allows the bias of pressure spring element 19 to be adjusted in the starting condition of the assembled support means 12. A suitable spacer element 27 may be inserted in pressure spring element 19 depending on the desired bias.

To securely brace pressure spring element 19 against winding support 13 and winding head 10, a recess 28 may be provided on outer side 14 of winding head 10, into which, for example, said first guide element 21 is form-locked. Correspondingly, a recess 29 is also formed on winding support 13, into which said second guide element 22 is form-locked. Pressure spring element 19 is expediently installed or removed using an appropriate tool, by means of which the spacing of guide elements 21, 22 is set to minimal, and as a result of which pressure spring elements 19, maximally compressed at this point, may be inserted or removed from recesses 28, 29.

Figure 2:
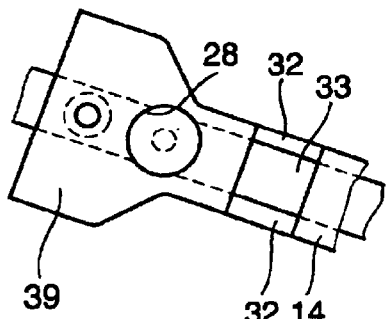

A coupling member 30 formed on outer side 14 of winding 10 is described in greater detail below with reference to FIGS. 1 to 3.

Figure 3:
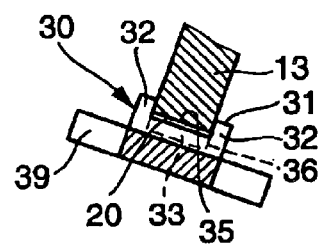

Coupling member 30, as seen in FIG. 3, is cut perpendicular to outer side 14 of winding head 10 to form a U-profile 31, which is open in the direction of winding support 13. Correspondingly, two U-legs 32 of coupling member 30, as seen in FIG. 2, extend in the surface line direction of outer side 14 of winding head 10. A U-base 33 formed between U-legs 32 projects perpendicularly to outer side 14. In the region of said coupling member 30, winding support 13 includes a recess 34 that is formed substantially complementary to U-base 33. A radial edge portion 35 of said recess 34 extends between U-legs 32 into U-profile 31. Winding support 13 and U-profile 31 are dimensioned such that winding support 13 engages coupling member 30 in the circumferential direction of winding head 10 and is thereby fixed to the latter. Further, two axial edge portions 36 of recess 34 overlap U-base 33 perpendicularly to outer side 14, here too, the configuration of recess 34 and coupling member 30 being so coordinated as to lock winding support 13 in position at winding head 10 in the surface line direction thereof.

In the embodiment shown herein, winding head 10 includes multiple pairs of clamping plates 37, each of which are associated with one of the winding supports 13. In other words, for each winding support 13, one such pair of clamping plates 37 is provided. Each pair of clamping plates 37 includes an inner clamping plate 38 disposed radially in the interior, and an outer clamping plate 39 disposed radially on the exterior. Clamping plates 38, 39 are fixedly clamped to one another by clamping bolts 40. Exterior clamping plate 39 forms the outer side 14 of winding head 10 in the region of the associated winding support 13, that is, one side of exterior clamping plate 39 facing winding support 13 defines outer side 14 of winding head 10 at that location. Correspondingly, in the embodiment shown herein, pressure spring element 19 abuts exterior clamping plate 39. Similarly, recess 28 on the side facing the winding head and coupling member 30 are also formed on exterior clamping plate 39.

In the embodiment shown herein, winding 9 consists radially of two layers of winding bars 8. The pair of clamping plates 37 is adapted to the latter and between the layers of winding bars 8, each plate includes an intermediate plate 41 provided with through holes 42 into which clamping bolts 40 fit. The aforementioned design can enhance the tensioning and stability of winding head 10. Moreover, the lower winding layer is secured to and polymerized with the upper winding layer in the region of the winding head during assembly.

In the preferred embodiment shown herein, clamping bolts 40 are formed of two parts and thus include a first bolt portion 43 and a second bolt portion 44. In the present embodiment the first bolt portion 43 is threaded axially into exterior clamping plate 39 and penetrates the radial, exteriorly disposed layer of winding bars 8 as well as intermediate plate 41. In contrast, the second bolt portion 44 is threaded axially into the first bolt portion 43 and penetrates the radial, interiorly disposed layer of winding bars 8 as well as inner clamping plate 38. Fastened on the second bolt portion 44 is a nut 45 that abuts inner clamping plate 38 via a cup spring or spring washer 46. This allows for the biased clamping of both clamping plates 38, 39, by means of which, e.g. it is possible to compensate for any settling occurring in the tensioned winding bars 8.

The two-part clamping bolts 40 can facilitate the insertion of winding bars 8 into core 2 during assembly of the two-layered winding 9.

Though the preferred embodiment described herein relates to a stator 1 of a generator, the scope of the present invention is not limited to a generator stator. Rather, the invention also covers in principle a stator for an electric motor of similar design.

LIST OF REFERENCE NUMERALS 1 stator
2 stator core
3 axial direction
4 front side of 2
5 pressure plate of 2
6 metal plate segment of 2
7 longitudinal groove of 2
8 winding bar
9 winding
10 winding head
11 radial direction
12 support means
13 winding support
14 outer side of 10
15 plate spring
16 first portion of 15
17 second portion of 15
18 support ring
19 pressure spring element
20 gap
21 first guide element
22 second guide element
23 sleeve of 21
24 bolt of 22
25 spring assembly
26 spring
27 spacer element
28 recess in 14
29 recess in 13
30 coupling member
31 U-profile
32 U-leg
33 U-base
34 recess in 13
35 radial edge portion of 34
36 axial edge portion of 34
37 pair of clamping plates
38 inner clamping plates
39 outer clamping plates
40 clamping bolt
41 intermediate clamping plate
42 through hole in 41
43 first bolt portion
44 second bolt portion
45 nut
46 cup spring or spring washer

We claim:

1. A device for tensioning a winding of a stator having a core, the winding including multiple winding bars which form, on at least one axial front side of the core of the stator, with ends of the multiple winding bars extending axially outward from the core, an expanding, funnel-shaped winding head, the device comprising:

multiple winding supports distributed circumferentially relative to the winding head on the front side of the core; and pressure spring elements;

a coupling member cut perpendicularly to an outer side of the winding head to form a U-profile that opens in the direction of the winding support, the coupling member having two U-legs, a U-base between the two U-legs, and being attached to the outer side of the winding head or to a side of the outer clamping plate facing the winding support;

wherein the two U-legs of the coupling member extend in a surface line direction of the outer side of the winding head;

wherein the U-base projects perpendicularly from the outer side of the winding head;

wherein the winding support includes a recess formed complementary to the U-base in the region of the coupling member, the recess including a radial edge portion;

wherein the radial edge portion of the recess projects into the U-profile perpendicularly to the outer side of the winding head and is attached in the circumferential direction by the U-legs;

wherein two axial edge portions overlap the U-base perpendicularly to the outer side of the winding head and are attached in the surface line direction by the U-base;

wherein the winding supports are axially supported by the front side of the core;

wherein each winding support is supported by the funnel-shaped outer side of the winding head via at least one pressure spring element; and wherein winding supports are attached to the winding head in a circumferential direction and in a surface line direction of an outer side of the winding head and are arranged for adjustment or movement perpendicular to said outer side.

2. A device according to claim 1, wherein at least one of the pressure spring elements includes a first guide element with a central sleeve, a second guide element with an axially adjustable bolt disposed medially in the sleeve, and a spring assembly comprising multiple disk- or plate-shaped springs arranged axially between the guide elements and concentrically to the sleeve.

3. A device according to claim 2, wherein each pressure spring element includes at least one spacer element arranged axially between the spring assembly and one of the guide elements, and is arranged concentrically to the sleeve.

4. A device according to claim 2, further comprising:

a recess formed on the outer side of the winding head into which one guide element of the pressure spring element is inserted;

a recess formed on the winding support into which the other guide element of the pressure spring element is inserted;

or both.

5. A device according to claim 1, wherein the winding head includes multiple pairs of clamping plates each of which are associated with one of the winding supports and each of which includes an inner clamping plate, an outer clamping plate, and clamping bolts, each inner clamping plate being clamped to an outer clamping plate by the clamping bolts, and wherein in the region of each winding support an outer clamping plate forms the outer side of the winding head.

6. A device according to claim 5, wherein, between each of the inner and outer clamping plates, the winding head comprises two layers of winding bars between which is arranged, for each pair of clamping plates, an intermediate plate into which the clamping bolts of each pair of damping plates are inserted.

7. A device according to claim 6, wherein the clumping bolts comprise two bolt portions, wherein a first bolt portion is threaded into a clamping plate and penetrates one layer of winding bars and the intermediate plate, and wherein a second bolt portion is threaded into the first bolt portion, penetrates the another layer of winding bars and the another clamping plate, and is supported by a screw head or nut.

8. A device according to claim 5, wherein each clamping bolt is supported at one of the clamping plates by a screw head or nut, and comprising a cup spring or spring washer arranged between the screw head and the clamping plate or between the nut and the clamping plate, each cup spring or spring washer introducing an initial stress force into each clamping bolt.

9. A device according to claim 1, further comprising at least one axially tensioned plate spring, and wherein at least one of the winding supports is attached at the front side of the core by the at least one axially tensioned plate spring, and wherein all of the winding supports are movable in an axial direction relative to the front side.

10. A device according to claim 1, further comprising at least one common support ring radially supporting and connecting the winding supports to one another.

11. A device according to claim 1, wherein during normal operation, when an apparatus includes a stator, or when said apparatus is in standstill, a gap is formed outside of the pressure spring element between each winding support and the outer side of the winding head.

12. A device according to claim 1, wherein the stator is a generator stator of a power plant.

* * * * *